June 24, 1930.   H. R. VAN DEVENTER   1,768,430
POWER CONDENSER AND COOLING MEANS THEREFOR
Filed June 10, 1924   2 Sheets-Sheet 1
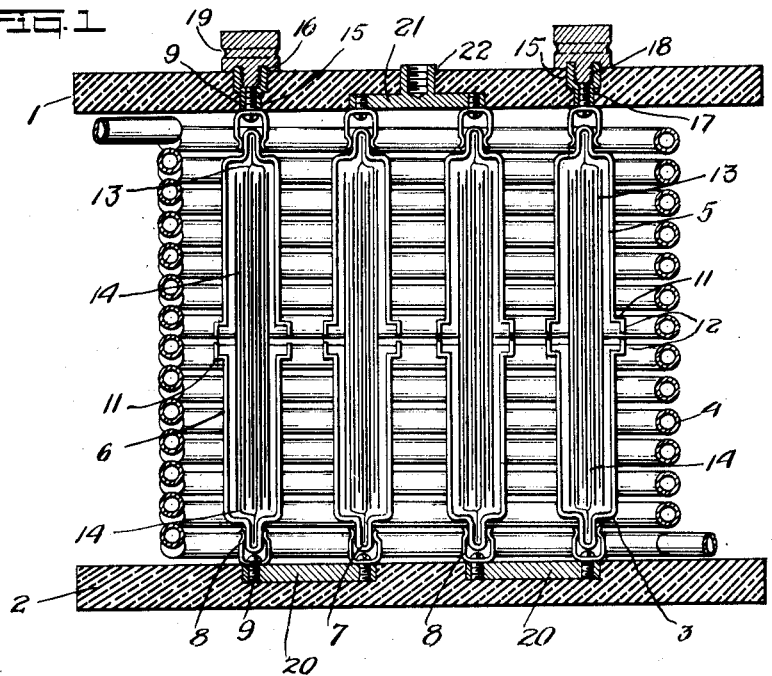
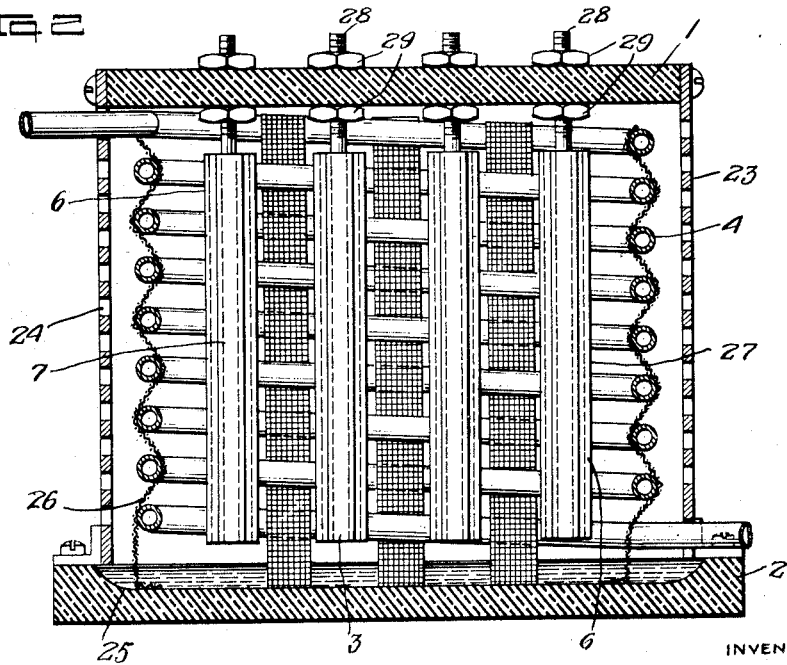
INVENTOR
Harry R. Van Deventer June 24, 1930. H. R. VAN DEVENTER 1,768,430
POWER CONDENSER AND COOLING MEANS THEREFOR
Filed June 10, 1924 2 Sheets-Sheet 2
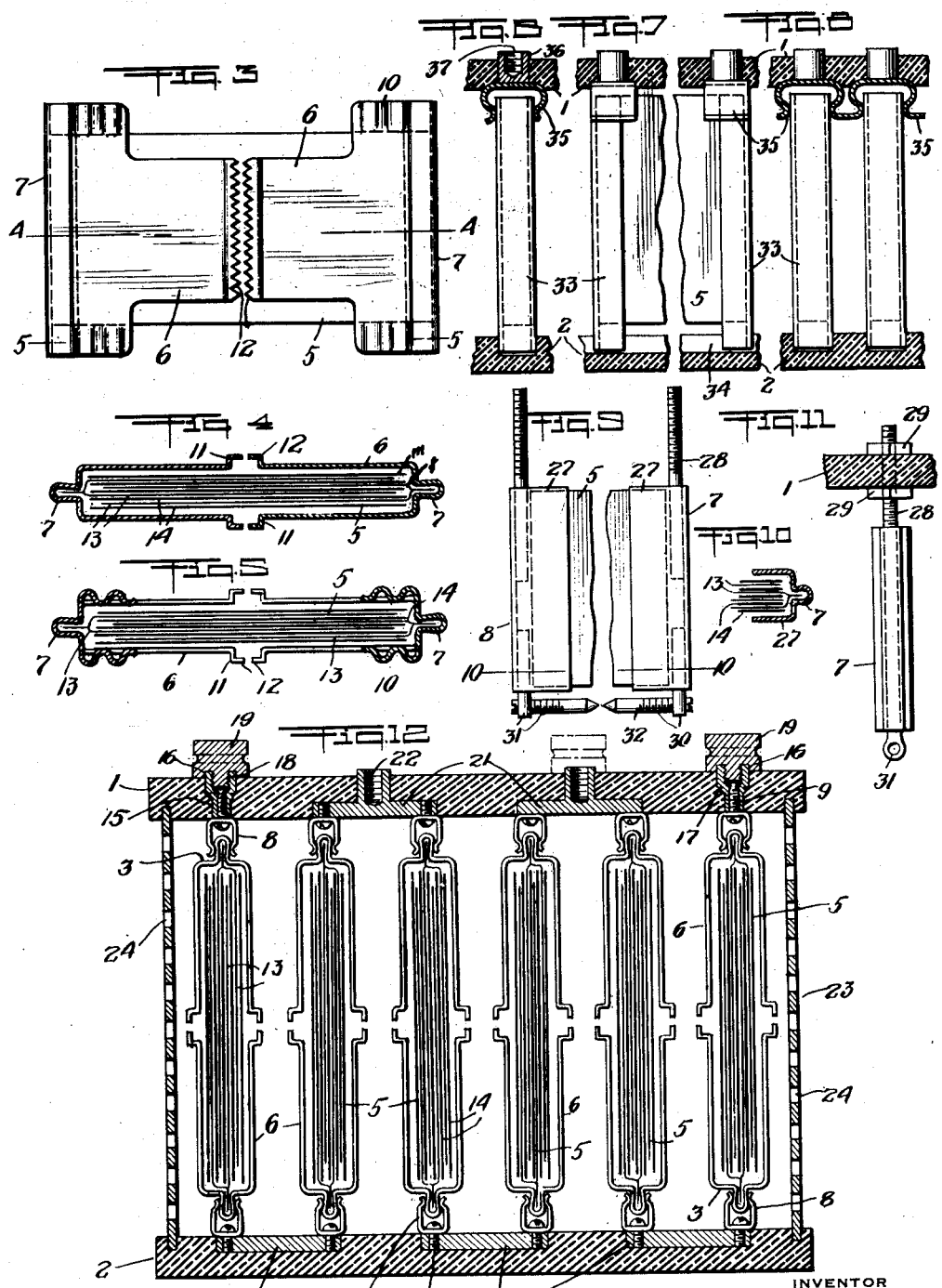
INVENTOR
Harry R. Van Deventer Patented June 24, 1930

1,768,430

UNITED STATES PATENT OFFICE

HARRY R. VAN DEVENTER, OF NEW YORK, N. Y., ASSIGNOR TO DUBILIER CONDENSER CORPORATION, OF NEW YORK, N. Y., A CORPORATION OF DELAWARE

POWER CONDENSER AND COOLING MEANS THEREFOR

Application filed June 10, 1924. Serial No. 719,140.

This invention relates to improvements in electrical condensers; particularly condensers for use in connection with electrical power circuits.

The invention comprises a condenser of superior construction, designed to be maintained at the highest possible efficiency and to operate with very small losses; and means for controlling the temperature of the condenser so as to prevent heating.

The objects and advantages of my invention will appear from the following description, and the novel features of the improvements are defined in the appended claims. The drawings, however, present only the best embodiments of my invention now known to me, and I may resort to changes in structure not necessarily illustrated, but embraced within the scope and spirit of the invention.

On the drawings:

Figure 1 is a view partly in section, showing in side elevation several condensers mounted in position to be connected to an electric circuit, and associated with suitable means such as a cooling coil to prevent overheating of the condensers;

Figure 2 is a similar view, showing slightly different means for controlling the temperature of the condensers;

Figure 3 is a top plan of one of the individual condensers or units employed in the practice of my invention;

Figure 4 is a section on the line 4—4 of Figure 3;

Figure 5, a section on the line 5—5 of Figure 3;

Figure 6 is an end view of a different form of an individual condenser or unit, and a different manner of mounting it;

Figure 7 is a side view of a condenser mounted as shown in Figure 6;

Figure 8 is an end view showing a pair of condensers mounted in operative position in the same manner as indicated in Figure 6, and connected together;

Figure 9 is a side elevation of another form of condenser;

Figure 10 is a section on the line 10—10 of Figure 9;

Figure 11 is an end view of the condenser shown in Figure 9, secured to a suitable support; and Figure 12 is a view partly in section, showing several condensers in end elevation as in Figure 1, with a casing to enclose the condensers.

The same numerals identify the same parts throughout.

Referring first to Figure 1, I show a construction having a top 1 and bottom 2, consisting of plates of suitable insulation such as bakelite, and between these two plates are disposed several individual condensers or units 3, to form a group surrounded by a coil 4 through which circulates a cooling or refrigerating agent such as water or some other fluid, by which the temperature of the several units can be maintained within the required limits. Each condenser comprises a body 5 made up of elements or sheets of some electrically conductive material, such as metal foil $f$ separated by insulation or dielectric, such as sheets of mica $m$; the sheets of mica being, of course, larger than the sheets of foil, and overlapping the edges of the foil except where the foil has portions projecting from the opposite ends of the body of the condenser. Half of the sheets of foil of one polarity thus project at one end of the condenser, for instance, the upper extremity in Figure 1, and the other half of the sheets of foil of opposite polarity having such portions projecting beyond the edges of the mica sheets at the lower ends of the condensers. It is to be understood, of course, that the general structural character of the stack or body 5 of each condenser is not a part of this invention, since the metal sheets and sheets of mica may be assembled in any desired manner within permissible limits, so long as the sheets are divided into two groups of opposite polarity and all the metal sheets are suitably insulated from one another, with the two groups of metal sheets arranged so that they can be readily connected to the extremities of an electrical circuit in which the condenser is to operate.

Each individual condenser or unit 3 is provided with a pair of clamps 6 engaging its opposite faces and of such size that almost the entire exterior of the condenser is covered thereby. These clamps can be made of suitable material such as metal of the required strength, and each clamp is substantially U-shaped, that is, it consists of a piece of metal doubled upon itself to receive an end of the unit between the two halves or arms thereof. Each clamp extends from the end of the condenser substantially to the middle and is wide enough to cover the opposite faces of the condenser over almost their entire breadth, and adjacent the end of the condenser, each clamp is bent or otherwise shaped so as to provide a projecting portion or bead 7, which extends the entire width of the clamp and across the end of the condenser to form a terminal to receive and hold fast the projecting portions of the foil sheets at the adjacent end of the condenser, and a mounting projection to be inserted into a clip 8. These clips 8 are secured to the inner faces of the top 1 and bottom 2 and are, of course, arranged in pairs, one clip of each pair to receive the portion 7 of one end of a condenser, and the other clip to receive the portion 7 at the opposite end of the same condenser so that the condensers or units 3 can be secured in fixed position with one end held by a clip attached to the top plate, and the other end held by an associated clip in corresponding position upon the bottom plate. These clips 8 are affixed to the top and bottom plates by means of screws 9.

The clamps 6 of each unit 3 are somewhat narrower over the portions which are adjacent the middle of the opposite faces of the condenser and somewhat wider adjacent the ends of the unit by which they are carried. In fact, as shown particularly in Figure 3, each of the clamps will have portions 10 adjacent the ends of the condenser which overlap and extend, in some degree, beyond the lateral edges of the condenser upon each face, as shown at 10, such portions being corrugated or ribbed from the sides of the condenser outward to increase the surface of the clamps and both strengthen the clamps, and enable the internal heat of operation generated in the individual condensers to be the more easily radiated. Adjacent the middle of the condensers upon each face thereof, the clamps have portions which are bent outward and away from the condenser, as shown at 11, and the edges of these portions are bent over to be substantially parallel with the adjacent faces of the condensers. Such portions are provided with teeth or serrations 12, the serrations of one clamp on each face of the condenser extending toward the serration upon the edges of the other clamp and providing a number of spark points. These points will be separated the required distance and are designed to permit flashing or discharge between them in case the potential applied to the terminals of the condenser should become too great for safety, and thus the danger of any of the sheets of metal foil *f* being punctured, or the condenser getting overcharged is obviated.

In Figures 1, 4 and 5, the projecting portions of the sheets of foil of one polarity are indicated by the numeral 13 at one end of the condenser, and shown as gripped tightly inside of the beaded portion forming the terminal and mounting projection 7; the numeral 14 indicating the projecting portions of the remaining sheets of opposite polarity similarly engaged by the portions 7 of the other clamp. As the outside layer or sheet of the body 5 of each condenser will be of mica or some other insulation, the clamps, while they grip the top of the condenser, do not make contact with the electrically conductive sheets at all, except at the projecting portions 13 and 14. The clamps are made to fit upon the stack tightly and hold the conductive sheets and sheets of mica in tight engagement over their entire surfaces. These clamps thus in effect, constitute the terminals of the condenser, keeping the stack under compression and further serving to provide a safety path for the discharge of the condenser in the event of excessive potential to prevent puncture, but also as an outside protective casing which is adapted to permit radiation of heat, and to allow of the necessary handling, to enable the condenser to be mounted between the plates 1 and 2 by having the beads 7 thereof inserted in the clips 8, with a minimum risk of breakage or injury.

As shown in Figure 1, two of the clips 8 affixed to the top 1 are held fast by the screws 9, being turned up into bushings 15 embedded in the top and having heads 16 somewhat enlarged, to provide a shoulder 17, the heads 16 being exposed on the upper face of the top and having a threaded bore 18 to receive a threaded projection at one end of a binding nut 19. By means of the nuts 19, an electric conductor can be attached to each of the heads 16. The group of clips 8 affixed to the bottom 2 are secured by the screws 9, being turned into plates 20 of conductive material embedded in the plate 2, and the clips 8 between the heads 16 in the upper plate are made fast to a similar plate 21 embedded in the lower face of the top and provided with a threaded aperture 22. With such a construction, the individual condensers or units 3 which are shown as four in number can all be joined in series by uniting the two terminals of a circuit to the heads 16, or if one terminal of the circuit be united to both the heads 16, and the other terminal be made fast by a binding screw engaging the threaded opening 22, each two of the condensers can be connected in series with each other, but in parallel with the other two; or if desired, the terminals of the circuit can be joined to the plate 21 and one of the heads 16, so that only two of the condensers will be connected in circuit and these two will be in series.

Figure 12 shows an arrangement of condensers similar to Figure 1, but with six condensers mounted in vertical position between a top plate 1 and a bottom plate 2, these plates serving as closures for the upper and lower ends of a casing 23, which is provided with apertures 24. In both Figures 1 and 12, the units are separated from one another by a sufficiently large space to permit radiation of heat from them, and thus heat is carried off in the case of Figure 1 by the cooling agent in the coil 4; while in the case of Figure 12, a circulation can be maintained through the casing 23 by causing a cooling agent to flow in and out through the apertures 24 to carry away the heat which is radiated from the separate units into the spaces between these units on the interior of the casing.

The construction of Figure 12 comprises two terminal heads 16, with binding nuts or screws 18 and two intermediate plates 21 with threaded apertures 22. With this construction, all the units can be connected in series or all but two in series, or only two joined in series, or any two of the condensers, and connected in parallel with an adjacent pair also connected in series.

In Figure 2, I show further a construction having the bottom plate 2 provided with a depression 25 in its upper or inner face to be filled with some suitable liquid, which can easily be evaporated, such as water. The top 1 and bottom 2 are used as before in combination with a casing 23, having apertures 24 and in this casing is a cooling coil 4 surrounding several units arranged as in Figure 1, but supported from the top only. Upon the turns of the coil 4 are strips of fibrous or absorbent material 26, weaving through the space between the successive turns of the coil and dipping into the pool of water at their lower ends. Thus the absorbent strips 26 become wet and saturated with water and by the evaporation of the water from these strips, the effect of the cooling coil is enhanced.

Figures 9, 10 and 11, show another type of unit comprising a top 5 of electrically conductive sheets interleaved with mica, but with clamps 27 that are shorter than the clamps 6 and engage only the opposite ends of the top of the condenser, without extending substantially up to the middle. Each of these clamps has terminal beads 7 to receive the projecting ends of the sheets of metal foil, and inserted into these beads are bolts 28 which are gripped tightly by the beads, so that when the projecting ends of these bolts are passed through holes in the top 1, they support the condenser and can be held fast by binding nuts 29 engaging the upper and lower faces of the top. Into the opposite ends of the beads 7, I may insert studs 30, having projecting ends 31 to receive threaded pointed screws 32, extending towards each other as illustrated in Figure 9, and separated only far enough to provide a safety spark gap. By the bolts 28, the units 3 can be suspended from the top 1 in the construction of Figure 2, and by suitably connecting these bolts, the units 3 can be joined in series or in parallel as desired. The screws 32 constitute adjustable protective means.

In Figures 6, 7 and 8, I show a condenser having a body or stack 5 and clamps in the form of channel bars or strips 33 gripping the opposite ends of the body 5, and having one extremity projecting beyond the side of the condenser to be received in a recess 34 in the bottom 2. The upper side of each condenser will be engaged by mounting and terminal clips 35, having stems 36 projecting through the top 1 with threaded openings 37 to receive binding nuts similar to the nuts 19 in Figure 1. These mounting clips engage the upper ends of the clamps 33 and by joining a conductor to each of the two clips 35, the conductive plates of opposite polarity in the condenser can be connected in circuit. Figure 8, shows a double clip 38, for a pair of such condensers placed face to face to be joined in parallel or in series, and obviously, by taking a strip of metal and bending it as shown in Figure 8, I can make a series of such clips for any desired number of condensers to be joined in parallel, if required.

In the condenser shown in Figures 6, 7 and 8, each condenser rests directly upon the bottom which receives the lower ends of the clamps 33 in the recess 34, and the top and bottom plates 1 and 2 can be joined together or held in the desired position by any suitable means, such as the walls of the casing 23, and with this type of condenser, I may employ a cooling coil 4 with or without the absorbent strips 26, as shown in Figure 2.

The supporting or mounting plates 1 and 2 will be held in fixed relation to each other in the construction shown on Figure 1, as well as in that shown on Figures 2 and 12, while the mounting means or bolts 28 of the condensers in Figure 2 serve the same purpose as the mounting means or clips 8 in the other forms.

Having described my invention, what I believe to be new and desire to secure and protect by Letters Patent of the United States is:—

1. A condenser comprising a body of elements of electrically conductive material, separated by insulation, clamps each enclosing the opposite ends of all of said elements and projecting beyond one side of said elements, and clips engaging the extremities of said clamps opposite the ends of said elements.

2. A condenser comprising a body of elements of electrically conductive material, separated by insulation, clamps engaging said body adjacent the opposite ends of the elements and projecting beyond one side of the elements, and clips engaging the extremities of said clamps opposite ends of said elements, said clips being in multiple form to receive the extremities of the clamps of a plurality of condensers to be connected in multiple by said clips.

3. A condenser comprising a body of elements of electrically conductive material, separated by insulation, clamps at the opposite ends of said elements, the clamps projecting at one extremity beyond the sides of said elements, a mounting plate adjacent the side of said elements having a recess to receive the projecting extremities of the clamps, a second mounting plate adjacent the side of said elements, and clips secured to said second mounting plate to engage the opposite ends of said clamps at opposite ends of the elements and enable the condenser to be connected into circuit.

4. A condenser comprising a body of elements of electrically conductive material, separated by insulation, and clamps engaging the opposite ends of said body, each of said clamps having a beaded hollow projection extending beyond the end of the body, to serve as a terminal and for mounting the condenser.

5. A condenser comprising a body made up of elements of electrically conductive material, separated by insulation, and clamps engaging opposite edges of said body and extending towards each other with their opposed edges separated by narrow spaces adjacent the sides of the condenser, said clamps being relatively wide adjacent the edges of the condenser and extending therefrom, and extending portions having corrugations therein.

6. A condenser comprising a body made up of elements of electrically conductive material, separated by insulation, and clamps engaging opposite edges of said body and extending towards each other with their opposed edges separated by a narrow space adjacent the middle of the sides of the condenser, said clamps being relatively wide adjacent the engaged edges of the condenser, and having portions projecting beyond the sides of the body adjacent said engaged edges.

7. A condenser comprising a body made up of elements of electrically conductive material, separated by insulation, and clamps engaging opposite ends of said body and extending towards each other with their opposed edges separated by a narrow space adjacent the middle of the condenser, said clamps being relatively wide adjacent the ends of the condenser, and having portions projecting beyond the opposite sides of the body adjacent said ends, said portions being corrugated.

8. A condenser comprising a body made up of elements of electrically conductive material, separated by insulation, clamps engaging the opposite ends of the condenser and covering substantially the entire area of both faces thereof, the opposing edges of the clamps adjacent the middle of the body being bent up and towards each other, and provided with serrations to form safety spark gaps, said clamps having projections extending along the opposite ends, to enable the condenser to be mounted and connected into circuit.

9. A condenser comprising a body of elements of electrically conductive material, separated by insulation, and clamps embracing the edges of the body and extending over substantially all the outer surfaces of said body, said clamps having beaded portions the interior of which serve as connecting means to the condenser body and the exterior of which support the condenser.

10. A condenser comprising a body of elements of electrically conductive material, separated by insulation, clamps embracing said body and forming circuit terminals therefor, and adjacent bent portions carried by said clamps forming an arc gap at a distance from the surface of the condenser.

11. A condenser comprising a body of elements of electrically conductive material, separated by insulation, and clamps embracing said body and forming circuit terminals therefor, said members having adjacent bent up toothed edges.

12. A condenser comprising a body of elements of electrically conductive materials, separated by insulation, clamps secured to the ends thereof, and beaded portions projecting from said clamps whereby the condenser may be supported from the exterior of said portions and connected to said elements by means of the interior of said portions.

13. A condenser comprising a body of elements of electrically conductive materials, separated by insulation, clamps upon the opposite ends of said body, and provided with corrugated heat radiating portions, said clamps having beaded portions whereby the condenser as a whole may be supported and connected to a circuit.

In testimony whereof I affix my signature.

HARRY R. VAN DEVENTER.